United States Patent [19]
Hennrick

[11] 3,852,887
[45] Dec. 10, 1974

[54] APPARATUS FOR INDICATING ENGINE PISTON POSITION
[75] Inventor: Donald F. Hennrick, Torrance, Calif.
[73] Assignee: Zed Vickers, Long Beach, Calif.
[22] Filed: Dec. 26, 1972
[21] Appl. No.: 318,532

Related U.S. Application Data
[63] Continuation-in-part of Ser. No. 206,785, Dec. 10, 1971, abandoned.

[52] U.S. Cl. ........................ 33/181 AT, 33/DIG. 15
[51] Int. Cl. ........................ G01b 3/28, G01b 5/14
[58] Field of Search .................. 33/DIG.15, 181 AT; 340/268; 324/16 T; 73/118, 119 R

[56] References Cited
UNITED STATES PATENTS
1,803,226   4/1931   Willis ............................. 340/268
2,072,984   3/1937   Haskins ........................... 340/268
2,511,392   6/1950   Worel ............................. 324/16 T
3,499,226   3/1970   Hopkins ........................... 33/169

FOREIGN PATENTS OR APPLICATIONS
130,195   7/1919   Great Britain ............... 33/DIG. 15
717,978   1/1932   France ........................ 33/DIG. 15

Primary Examiner—Louis R. Prince
Assistant Examiner—Charles E. Phillips
Attorney, Agent, or Firm—Edward A. Sokolski

[57] ABSTRACT

A small pencil-like implement is mounted in the spark plug hole atop a cylinder and precisely indicates a predetermined position of a piston within such cylinder at or near top dead center by means of a self-contained light circuit. A calibrated indicator is included to precisely indicate positions of the piston away from the top dead center position in any desired amount.

9 Claims, 10 Drawing Figures

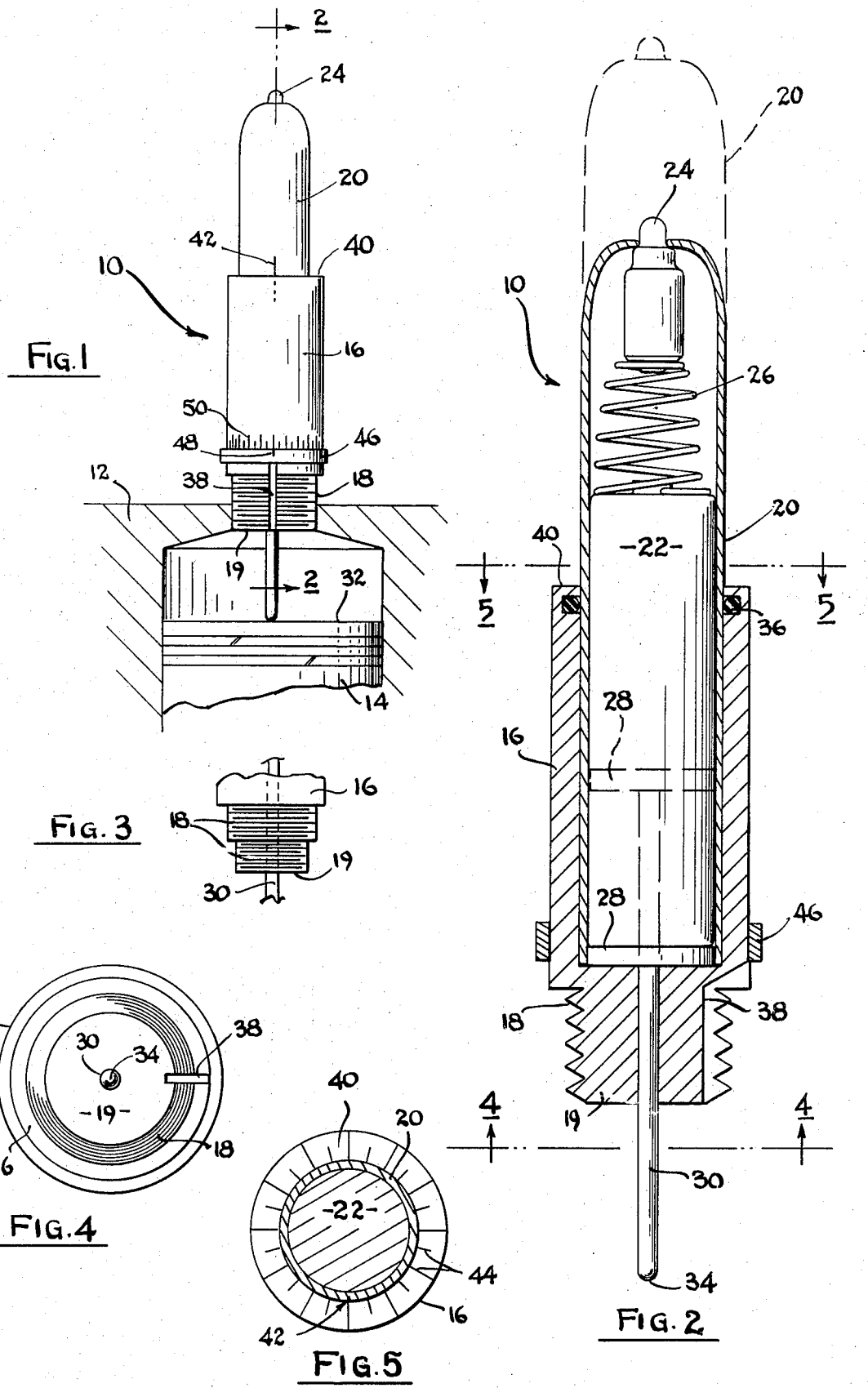

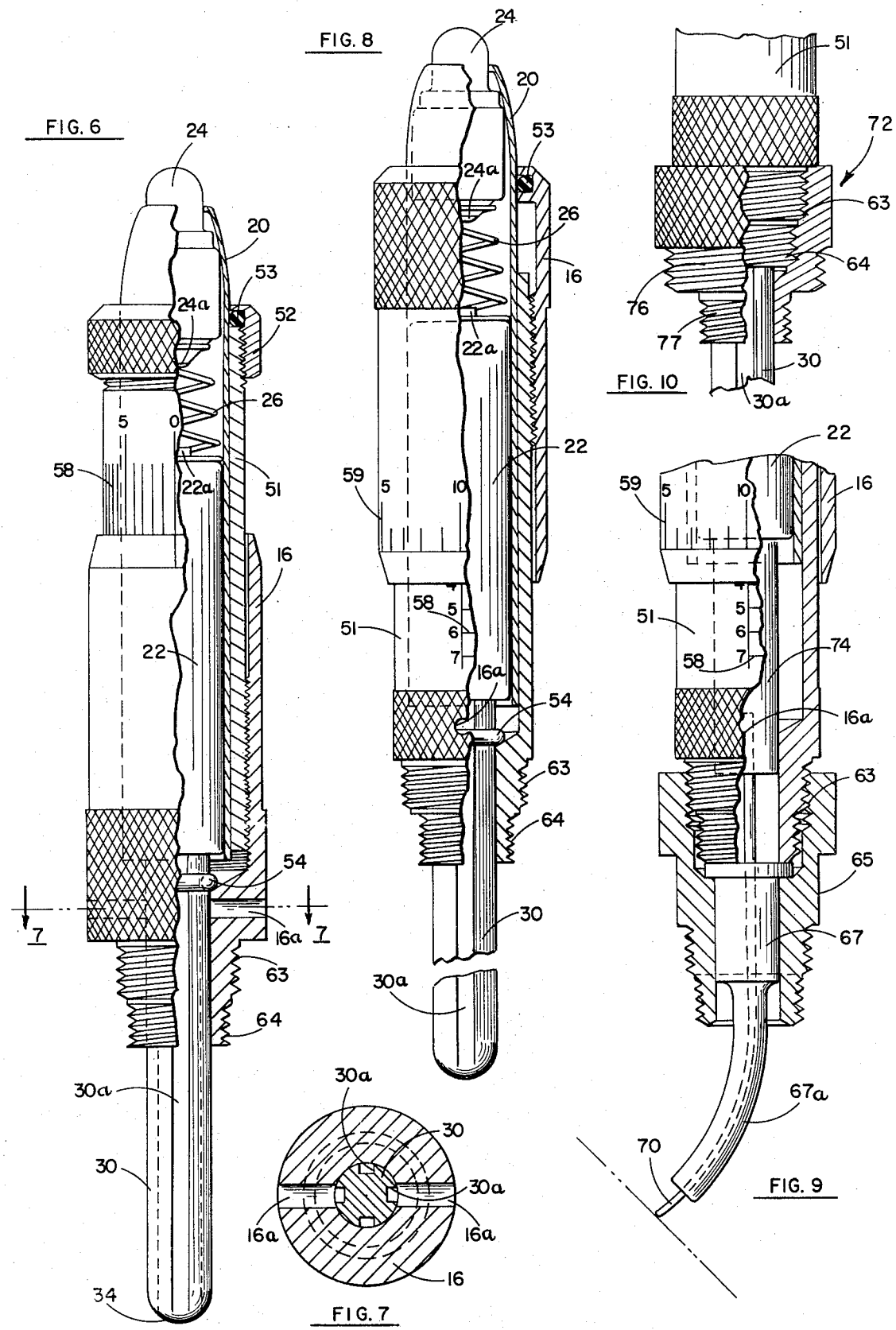

APPARATUS FOR INDICATING ENGINE PISTON POSITION

This application is a continuation in part of my application Ser. No. 206,785 filed Dec. 10, 1971, now abandoned.

This invention relates to a device for checking the timing of an internal combustion engine, and more particularly to such a device providing a lamp indication when the piston of an engine arrives at or a predetermined distance from top dead center.

BACKGROUND OF THE INVENTION

In the operation of internal combustion engines, the parameters related to ignition timing are particularly sensitive in that small inaccuracies may seriously impair performance and increase operating costs. The controlling factor upon which all other variables depend when adjusting ignition timing is the position of the piston within its cylinder. Thus, it is necessary to insure that the ignition arc occurs across a spark gap at a predetermined distance of the piston away from the top dead center (TDC) position on the compression upstroke thereof. Ideally speaking, the flame front should begin propagating before the piston has completed its maximum compression of the burn mixture.

The prior art includes several devices for determining the TDC position of a piston within a cylinder. However, these devices do not generally include a capability for measuring a precise distance which the piston may be spaced away from the TDC position at the time an indication signal is generated. Usually, after determining when the piston reaches the TDC position, a process of estimation is required in determining how far away from such position the piston is situated when arcing is initiated across the spark plug gap.

The prior art also includes another type of device which is much more sophisticated than the type just mentioned, but which gives an indication of piston distance away from TDC position. However, the latter type of device is characterized by a complexity of parts which result in the need for considerable skill and care in its operation, and substantial expense in its manufacture. Both of these drawbacks outweigh the usefulness of the device to an ordinary householder or cycling enthusiast who is not a skilled mechanic but wishes to adjust the timing of his trail-bike, motorcycle, lawn mower, or other piston-operated device, without paying an amount for tools equivalent to what he saves by doing this work himself to avoid costly professional fees for having it done.

The foregoing types of device are typified by issued U.S. Pat. Nos. 1,803,226; 2,072,984; 2,511,392; 2,577,835, and 2,413,126.

SUMMARY OF THE INVENTION

Briefly described, the device of the invention is as follows: A casing has a plunger member slidably mounted therein. One end of the casing is adapted to be attached to the top portion of an engine cylinder where a spark plug is normally inserted, with one end of the plunger placed in the cylinder. A dry cell and an indicator lamp are also mounted in the casing with a spring being positioned between the battery and lamp so as to resiliently urge the battery away from the lamp and towards the plunger. As the piston in the cylinder under test approaches the top dead center position, it drives the plunger which in turn drives the dry cell towards the lamp until the lamp and cell finally contact to light the lamp. The position of the plunger at which the lighting of the lamp occurs is set so that the plunger will reach this position when the piston is at top dead center or a predetermined distance therefrom. In this manner, a precise indication of when the piston reaches this position during each cylinder cycle is provided. Means are provided in the device to vent the cylinder so that its compression will not be great enough to drive the plunger. Further, a calibrated adjustment is provided for precisely setting the position of the plunger at which actuation of the lamp will occur, this position corresponding to a predetermined position of the piston at or near top dead center.

BRIEF DESCRIPTION OF THE DRAWINGS

FIG. 1 is a side elevational view of one embodiment of the inventive device mounted for use on an internal combustion reciprocating engine;

FIG. 2 is a cross-sectional view of the device shown in FIG. 1;

FIG. 3 is a fragmented isolated view of a detailed modification of the structure shown in FIGS. 1 and 2;

FIG. 4 is a bottom view taken along line 4—4 of FIG. 2;

FIG. 5 is a top plan view, partly in cross-section, taken along line 5—5 of FIG. 2;

FIG. 6 is a side elevational view partly in section of another embodiment of the invention;

FIG. 7 is a cross-sectional view taken along the plane indicated by 7—7 in FIG. 6;

FIG. 8 is a side elevational view, partly in section, of still a further embodiment of the invention;

FIG. 9 is a side elevational view partly in section of still another embodiment of the invention; and FIG. 10 is a side elevational view partly in section of an adapter that may be used with the device of the invention to accommodate for different cylinder aperture sizes.

DESCRIPTION OF THE PREFERRED EMBODIMENTS

Referring to FIG. 1, indicator 10 may be seen mounted on an engine or cylinder head 12 or equivalent structure in the position normally occupied by a spark plug. Piston 14 within the mentioned engine reciprocates vertically during operation due to its connection with a rotatable crankshaft (not shown). The piston position within the cylinder anywhere between the maximum extremes of its total movement range is normally defined in degrees of crankshaft rotation, the top dead center position being zero degrees, at which the piston is at the very top of its stroke. Proper combustion within the compressed mixture of fuel and air should not include any local or general spontaneous explosions, but a so-called flame front which passes through the compressed air and vapor to create a rapid but smooth increase of pressure which acts outwardly from a theoretical geometric center within the volume occupied by the mixture, driving the piston downwardly on the power stroke with a force determined by the area of the piston workface and the amount of pressure acting on each unit of such area. The instant when ignition should begin depends upon several factors including the octane rating of the gasoline, the compression ratio of the cylinder, and the rotational speed of the crankshaft, among others. An error as little as two degrees in piston position relative to the TDC position when ignition begins can result in very significant loss in performance, increased operating expense, and other adverse effects.

Accordingly, it is the purpose of indicator 10 to permit rapid and accurate determination of the TDC position of piston 14, and thereafter to provide an indication of its firing position at any desired distance away from top dead center. As used herein, the firing position is the location of piston 14 relative to TDC at the instant when arcing occurs and flame propagation is initiated, and may illustratively be, for example, minus six degrees. This firing position would be identified with a crankshaft position six degrees of rotation just before the TDC position of piston 14 is reached on its compression stroke. The mentioned position of minus six degrees, or any other desired firing position relative to TDC, may be accurately determined by use of indicator 10 as described below.

The indicator essentially comprises a telescoping assembly of axially aligned, concentric elongate and substantially cylindrical elements 16 and 20. Outer tubular element 16 has threads 18 formed on the lower end 19 thereof, these threads being configured for engagement within the threaded hole normally occupied by the spark plug (not shown) of a cylinder 12 having piston 14 therein. Inner cylinder or sleeve 20 is sized and surface treated for firmly but slidably fitting within outer tube 16, whereby these two elements cannot be displaced relative to each other except by application of firm manual force. If insufficient friction is obtained between elements 16 and 20 so that they remain relatively immovable at any displacement position following removal of the displacing force, the necessary holding force may be achieved by use of a flexible seal or friction means between the elements as suggested by rubber O ring 36 in FIG. 2. O ring 36 is nested within a circular groove formed on the inner wall of hollow tube 16, and sized to result in substantially radially inward directed force applied to sleeve 20 by the innermost surface of O ring 36 when the ring is engaged within the mentioned groove and the parts of indicator 10 are assembled in operative relationship.

A dry cell battery 22 contained within sleeve 20 is similarly adapted for slidable translational movement relative to the sleeve, but without sufficient friction to restrain such movement under the force applied by coil spring 26, for reasons discussed below. The amount of friction which exists between elements 16 and 20 must be sufficient to overcome the biasing force of spring 26. The mentioned spring extends between battery 22 and a small light bulb 24 affixed or otherwise secured to sleeve 20 at the uppermost end thereof in the manner suggested by FIGS. 1 and 2.

Plunger 28 is contained within sleeve 20 and has an elongate protruding stem 30 integrally formed on the plunger. Stem 30 extends through a center passage axially formed within lower end 19 of tube 16. Also, a space gap or channel 38 is cut along the outer surface of lower end 19 and extends completely across the threaded portion thereof as seen in FIGS. 2 and 4, so that no compression of air within cylinder 12 will occur when piston 14 is moved to simulate the compression stroke during use of indicator 10.

In use, after removal of the spark plug from cylinder 12, indicator 10 is mounted in the spark plug hole as seen in FIG. 1 by rotation of tube 16 so that threads 18 will engage the threads in the stated hole. Initially, complete engagement of the threads is not desirable, but only sufficient engagement of threads 18 in cylinder 12 to provide adequately stable support for tube 16 and the components operatively connected therewith. Thus, some of threads 18 are exposed above cylinder 12 as seen in FIG. 1, permitting additional rotation of tube 16 after the TDC position of piston 14 is determined, for reasons described below.

Following the initial mounting of indicator 10 as shown in FIG. 1, sleeve 20 is manually pushed downwardly together with battery 22 and plunger 28 into the position suggested by solid lines in FIG. 2. Then the engine crankshaft is slowly turned over so that piston 14 will move upwardly until workface 32 thereof contacts lower distal end 34 of stem 30 on plunger 28. As the piston continues to move upwardly within cylinder 12, workface 32 will apply force to stem 30 moving plunger 28, and battery 22 against which the plunger bears, also upwardly until the battery compresses spring 26 fully and contacts bulb 24, energizing the same and causing the bulb to illuminate. Continued crankshaft rotation now causes sleeve 20 to be displaced upwardly relative to stationary tube 16. Illumination of bulb 24 is continuous during this stage of the operation. When piston 14 reaches the very top of the compression stroke, it reverses its direction of movement. At the precise instant when this occurs, and the piston starts to move downwardly but an extremely minute amount, plunger 28 and battery 22 also start such downward movement and the electrical contact between battery 22 and bulb 24 is separated whereupon the light is extinguished. This termination of the illumination from source 24 is the signal to an observer that TDC position coincides with the piston position at which the light went out.

After the foregoing steps have been completed, force is manually applied to restrain sleeve 20 against rotation relative to tube 16, and tube 16 is rotated deeper within the hole in which it is mounted. The amount of this additional rotation of the tube 16 will depend upon the desired firing position of piston 14 relative to its TDC position. Thus, each complete revolution of tube 16 through 360 degrees of manual rotation will result in a predictable increment of vertical movement thereof, the precise amount of which depends upon the slope or pitch of screw threads 18. If, for example, each 360 degrees rotation of tube 16 causes downward displacement of the tube .03 inches, and if a minus six degree firing position of piston 14 is equivalent to a distance of workface 32 one-tenth inches from the top dead center position for such workface, then tube 16 should be rotated through 3 and ⅓ revolutions in the direction causing greater penetration of end 19 into cylinder 12. The foregoing vertical downward movement of tube 16 will be accompanied by a similar movement of sleeve 20 and bulb 24 secured thereto.

In order to determine the precise amount tube 16 is rotated after the TDC position of piston 14 has been initially determined using indicator 10, two different expedients are suggested by way of illustration only, in the drawings. Referring to FIG. 1, tube 16 may be seen to have a flat end 40 at the top thereof, which is graduated by equidistantly spaced marks to form a radial scale 44 seen in FIG. 5. A reference mark or index 42 may be inscribed as by a shallow groove in the surface of sleeve 20, so that rotation of tube 16 while sleeve 20 is held against rotation will provide a means to determine how much angular displacement has occurred by comparing the index position before and after such rotation, hence enabling the observer to measure the vertical displacement of the tube 16 in accordance with the relationship established by the pitch of threads 18 as discussed above.

Alternatively, instead of the index mark 42 on sleeve 20 as described above, the same purpose may be accomplished using a freely rotatable ring 46 loosely surrounding tube 16 as seen in FIG. 2. Ring 46 is provided with an index mark 48 seen in FIG. 1, while tube 16 has a scale graduated in degrees or other convenient units shown by scale 50. Ring 46 is restrained by manual holding force while tube 16 is rotated in the same manner described above in connection with scale 44 and index 42.

When indicator 10, and particularly tube 16 and sleeve 20, have been adjusted at a lower position after the TDC position of piston 14 has been initially established, the engine crankshaft is again slowly moved until workface 32 moves plunger 28 and battery 22 upwardly, again energizing bulb 24. When the bulb illuminates, this signals that the minus six degree firing position identified with the lower repositioning of tube 16 as accomplished above has been achieved, and the timing system can thereafter be adjusted as required to initiate an electrical arc at this position of piston 14 using conventional adjusting means and techniques.

Referring to FIG. 3, it may be seen that a stepped configuration of end 19 may be used with two different diameters and two different thread sizes, for use of indicator 10 in two different size spark plug holes such as may distinguish an outboard motorboat engine from a gasoline powered lawn mower engine, for example. In either case, use of the indicator will in no significant detail differ from the steps described above.

It will also be understood that tube 16 functions as the support means for indicator 10 due to threads 18 which are formed on end 19 thereof, and that sleeve 20 constitutes translationally movable means which moves linearly upwardly when force is applied thereto by piston 14 acting through force transmitting means in the form of plunger 28. The plunger is thus adapted to extend between the piston and battery 22 which constitutes electrical energy means for contacting a source of illumination consisting of bulb 24 to energize or de-energize the same. In view of the basic simplicity of the design thus achieved in indicator 10, characterized by a minimum of moving parts and the fact that cylindrical or otherwise symmetrical shapes are easier and faster to make, the mentioned principal component parts of indicator 10 result in a relatively low manufacturing cost and a considerable adaptability for mass production techniques. Also, since only two main steps are required in its operation, use of indicator 10 does not require highly developed skills, but is well suited for unskilled individuals having only rudimentary knowlege of reciprocating internal combustion engines.

Referring now to FIGS. 6 and 7, another embodiment of the invention is illustrated. For this and the succeeding embodiments to be described, the same reference numerals are utilized to identify portions corresponding to those of the first described embodiment. Inner tubular sleeve 20 has lamp 24 mounted on one end thereof. Dry cell 22 and spring 26 are removably inserted inside sleeve 20 with spring 26 interposed between the lamp and the dry cell. Sleeve 20 is firmly held to tube member 51 by means of adjustable ring member 52 which is threadably connected to tube member 51, there being an O-ring 53 interposed between ring member 52 and the surface of sleeve 20. This O-ring is expanded as ring 52 is tightened so as to provide resilient holding pressure to hold tube member 50 to sleeve 20. Tube member 51 is threadably attached to outer tube member 16.

Plunger 30 is slidably supported in the bottom end of outer tube member 16 for movement along the longitudinal axis thereof and is prevented from sliding out of the tube member by means of grommet 54 which is retained within a slot (not shown) formed in the plunger. The end of plunger 30 abuts against the end of dry cell 22 such that upward drive on the end 34 of the plunger by an engine piston will drive the dry cell towards lamp 24 compressing spring 26 and finally, when the positive terminal 22a of the cell is driven against the terminal 24a of the lamp, will cause ignition of the lamp. Spring 26 also serves to provide a current path between the negative electrode of the cell (the outer casing) and the casing of the lamp which is the other terminal thereof. The longitudinal position of plunger 30 on which such completion of the electrical circuit will occur, can be adjusted by rotating tube member 16 relative to tube member 51 to change the relative longitudinal positioning between these two members. This adjustment can be made by reference to calibration marks 58 on tube member 51, these calibration marks being scribed to indicate various positions of the piston relative to top dead center. Plunger 30 has longitudinal slots 30a formed therein which, together with apertures 16a, formed in the bottom portions of outer tube 16, provide venting passageways for the cylinder so that the compression thereof is lowered so as not to actuate the plunger. Different diameter threaded portions 63 and 64 are provided at the end of outer tube 16 to permit insertion into different sized spark plug apertures, as for the previous embodiment. The embodiment of FIGS. 6 and 7 has an advantage over the previous embodiment in providing a readily visible accurately calibrated adjustment for setting the device to precisely indicate top dead center of the piston, or a desired departure from this position.

Referring now to FIG. 8, another embodiment of the invention is illustrated. In this embodiment, lamp 24 and dry cell 22 are mounted between spring 26 in inner sleeve 20 in the same general fashion as in the embodiment just described. Outer tube member 16 is held to sleeve 20 by virtue of the friction contact provided by O-ring 53. Middle tube member 51 is retained between sleeve 20 and outer tube member 16 by virtue of its threadable engagement with outer tube member 16. Plunger 30 is slidably mounted in tube member 51 and one end thereof is held to the tube member by means of O-ring 54 which is retained in a slot (not shown) formed in the plunger. Calibrated indicia 58 and 59 are provided on tube members 51 and 16 respectively, to enable the accurate adjustment of the device for indicating a desired piston position at or near top dead center. The device operates in the same manner as described for the embodiments of FIGS. 6 and 7, the significant difference of course being in the reversal of the positions of outer tube member 16 and middle tube member 51 with the outer tube now being fixedly connected to the inner sleeve, as compared with the middle tube in the previous case.

Referring now to FIG. 9, still another embodiment of the invention is illustrated. This embodiment is useful where the direction of piston travel is angled with respect to spark plug attachment thread hole. Except for the changes now to be described, this embodiment is the same as that described in connection with FIG. 8. Threadably attached to thread 63 at the end of tube member 51 is adapter 65. Retained in adapter 65 is sleeve member 67 which has a curved end portion 67a which protrudes out from the device and is inserted into the cylinder. A wire actuator member 70 is slidably supported in sleeve 67 and is fixedly attached to plunger 74 by suitable means, such as force fitting. Wire actuator 70 is thus driven by the piston and acts to drive the plunger 74 against the base of dry cell 22. From this point on, the construction and operation is identical to that of the previous embodiment. Venting for the cylinder is provided in the air space between wire 70 and sleeve member 67.

Referring now to FIG. 10, an adapter member 72 which may be utilized to adapt the device of the invention for use with additional different sized spark plug apertures is shown. This device threadably attaches to the threaded portion 63 of tube member 50 and provides two different diameter threaded attachments 76 and 77 for use with corresponding mating spark plug apertures.

While the invention has been described and illustrated in detail, it is to be clearly understood that this is intended by way of illustration and example only and is not to be taken by way of limitation, the spirit and scope of this invention being limited only by the terms of the following claims.

I claim:

1. A device for indicating when a piston of an internal combustion engine has reached a predetermined position within a cylinder having a spark plug aperture comprising:
    casing means comprising an inner sleeve, a first tube member fixedly attached to said sleeve and a second tube member threadably attached to said first tube member,
    a dry cell mounted in said inner sleeve,
    an indicator lamp mounted in said inner sleeve with one of the electrical contacts thereof opposite one of the electrical contacts of said dry cell,
    means for resiliently urging said dry cell away from said indicator lamp,
    actuator means slidably mounted in said second tube member, with one end of said actuator means protruding out from one end of said second tube member and the other end of said actuator means abutting against said dry cell,
    said one end of said casing means being adapted to fit to the sparkplug aperture of the engine cylinder with said one end of said actuator means extending into the cylinder, and
    calibrated means comprising indicia on at least one of said tube members, said tube members being adjustable on their threaded attachment to effect relative longitudinal movement therebetween for adjusting said device to set the position of said actuator means whereat the oppositely positioned contacts of said dry cell and said lamp will contact each other so as to actuate said lamp.

2. The device of claim 1 wherein said first tube member is in external concentricity with said second tube member.

3. The device of claim 1 wherein said first tube member is in internal concentricity with said second tube member.

4. The device of claim 1 wherein said actuator means comprises a linear plunger.

5. The device of claim 1 wherein said actuator means comprises a curved sleeve member, a wire member slidably mounted in said sleeve member and a plunger attached to said wire member.

6. The device of claim 1 and further including means for venting the compression of said cylinder.

7. The device of claim 6 and further including venting means for venting the compression of said cylinder comprising longitudinal slots formed in said plunger and apertures formed in said casing means, said longitudinal slots being in fluid communication with said casing apertures.

8. A device for indicating when the piston of an internal combustion engine has reached a predetermined position in a cylinder having a spark plug aperture comprising:
    a cylindrical sleeve,
    an indicator lamp mounted in one end of said sleeve with a portion thereof protruding from the sleeve,
    a dry cell mounted within said sleeve with one electrical terminal thereof facing one electrical terminal of said lamp,
    a coil spring interposed between said lamp and said dry cell for resiliently urging the lamp and cell apart, and providing an electrical current path therebetween,
    a first tube member fixedly attached to said sleeve in external concentricity therewith,
    a second tube member threadably attached to said first tube member, and
    a plunger slidably mounted in said second tube member, one end of said plunger abutting against said dry cell, the other end of said plunger protruding from said second tube member,
    attachment means being formed on one end of said second tube member for attaching said device to the spark plug aperture of the cylinder with the plunger extending into the cylinder,
    one of said tube members having calibration indicia thereon for enabling an operator to determine the longitudinal positioning of said tube members relative to each other by relative rotational adjustment of the tube members on their threadable attachment,
    whereby the plunger is driven by the piston to cause the dry cell to contact the lamp when the piston has reached a position indicated by the calibration indicia.

9. The device of claim 8 and further including means for venting the compression of the cylinder comprising at least one longitudinal slot formed in said plunger and an aperture formed in said second tube member in fluid communication with said slot.

* * * * *